United States Patent
Jang et al.

(10) Patent No.: US 9,661,642 B2
(45) Date of Patent: *May 23, 2017

(54) METHOD AND APPRATUS FOR AVOIDING INTEFERENCE IN TERMINAL WITH PLURAL HETEROGENEOUS COMMUNICATION MODULES IN WIRELESS COMMUNICATION SYSTEM

(71) Applicant: Samsung Electronics Co., Ltd., Suwon-si, Gyeonggi-do (KR)

(72) Inventors: Jae Hyuk Jang, Suwon-si (KR); Soeng Hun Kim, Yongin-si (KR); Gert-Jan Van Lieshout, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 66 days.

This patent is subject to a terminal disclaimer.

(21) Appl. No.: 14/579,392

(22) Filed: Dec. 22, 2014

(65) Prior Publication Data

US 2015/0103805 A1    Apr. 16, 2015

Related U.S. Application Data

(63) Continuation of application No. 13/205,830, filed on Aug. 9, 2011, now Pat. No. 8,923,862.

(30) Foreign Application Priority Data

Jul. 25, 2011    (KR) ........................ 10-2011-0073608

(51) Int. Cl.
*H04W 72/08*    (2009.01)
*H04W 24/10*    (2009.01)
(Continued)

(52) U.S. Cl.
CPC ......... *H04W 72/082* (2013.01); *H04W 24/10* (2013.01); *H04W 36/30* (2013.01);
(Continued)

(58) Field of Classification Search
None
See application file for complete search history.

(56) References Cited

U.S. PATENT DOCUMENTS

2004/0127191 A1    7/2004    Matsunaga
2005/0020297 A1    1/2005    Axness et al.
(Continued)

FOREIGN PATENT DOCUMENTS

JP    2004207839 A    7/2004
JP    2008535332 A    8/2008
(Continued)

OTHER PUBLICATIONS

"Transfer of UE Capabilities Over Si", 3GPP TSG RAN WG3, Mar. 31-Apr. 3, 2008, Shenzhen, China.
(Continued)

*Primary Examiner* — Eunsook Choi
(74) *Attorney, Agent, or Firm* — Jefferson IP Law, LLP

(57) ABSTRACT

A method for avoiding mutual interference when heterogeneous communication modules such as LTE, wireless LAN, Bluetooth, and GPS coexist in a terminal in a wireless communication system is provided. The terminal may reduce mutual interference when a plurality of communication modules simultaneously operate to efficiently communicate therewith.

16 Claims, 9 Drawing Sheets

Related U.S. Application Data

(60) Provisional application No. 61/374,182, filed on Aug. 16, 2010.

(51) Int. Cl.
*H04W 36/30* (2009.01)
*H04W 28/18* (2009.01)
*H04W 64/00* (2009.01)
*H04W 84/12* (2009.01)
*H04W 84/18* (2009.01)
*H04W 88/06* (2009.01)
*H04W 88/08* (2009.01)
*H04W 28/04* (2009.01)

(52) U.S. Cl.
CPC ............ *H04W 28/04* (2013.01); *H04W 28/18* (2013.01); *H04W 64/00* (2013.01); *H04W 84/12* (2013.01); *H04W 84/18* (2013.01); *H04W 88/06* (2013.01); *H04W 88/08* (2013.01)

(56) References Cited

U.S. PATENT DOCUMENTS

| | | |
|---|---|---|
| 2007/0032265 A1 | 2/2007 | Park |
| 2009/0143095 A1 | 6/2009 | Zhang |
| 2009/0296785 A1 | 12/2009 | Wu et al. |
| 2010/0304730 A1 | 12/2010 | Huang et al. |
| 2011/0312288 A1* | 12/2011 | Fu ........................ H04B 1/406 455/88 |
| 2012/0040620 A1* | 2/2012 | Fu ........................ H04B 1/1027 455/63.1 |
| 2012/0069766 A1* | 3/2012 | Fu ........................ H04B 1/406 370/252 |
| 2012/0207040 A1 | 8/2012 | Comsa et al. |

FOREIGN PATENT DOCUMENTS

| | | |
|---|---|---|
| JP | 2009060250 A | 3/2009 |
| KR | 10-0651843 B1 | 12/2006 |

OTHER PUBLICATIONS

"RRC Connection Establishment: Reject With Frequency Info Set to the Same Frequency Band—Successful Case", 3GPP TS 34.123-1 V9.1.0, pp. 2-14.

3GPP, "3rd Generation Partnership Project; Technical Specification Group Radio Access Network; Evolved Universal Terrestrial Radio Access (E-UTRA); Radio Resource Control (RRC); Protocol specification (Release 9)", 3GPP TS 36.331 V9.3.0, Jun. 17, 2010.

Ericsson et al. "Methods for WLAN/Bluetooth in-device coexistence interference avoidance", 3GPP TSG-RAN WG2 #70bis, R2-103900, Jun. 22, 2010.

* cited by examiner

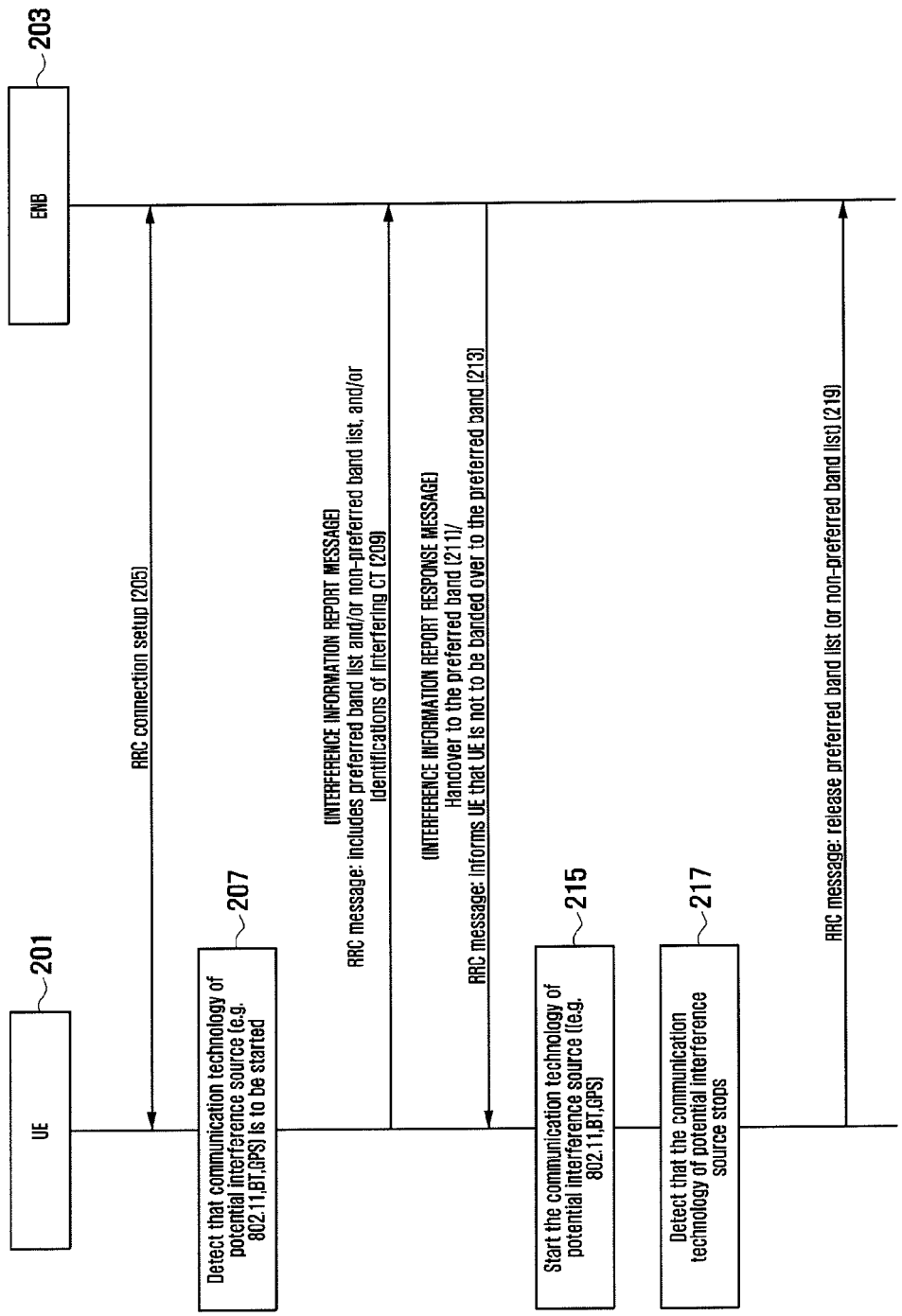

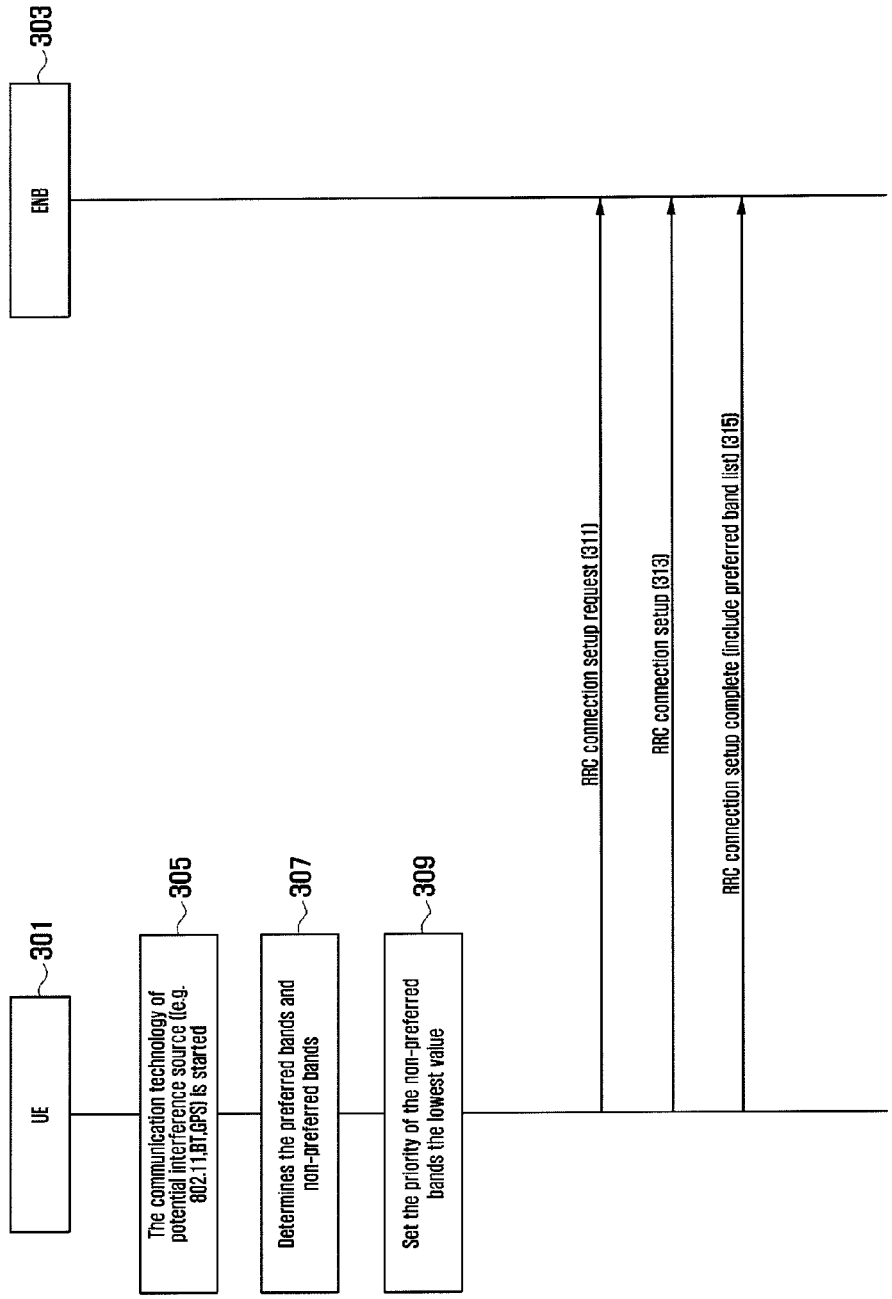

METHOD AND APPRATUS FOR AVOIDING INTEFERENCE IN TERMINAL WITH PLURAL HETEROGENEOUS COMMUNICATION MODULES IN WIRELESS COMMUNICATION SYSTEM

PRIORITY

This application is a continuation application of a prior application Ser. No. 13/205,830 filed on Aug. 9, 2011, which claimed the benefit under 35 U.S.C. §119(e) of a U.S. provisional patent application filed on Aug. 16, 2010 in the U.S. Patent and Trademark Office and assigned Ser. No. 61/374,182, and under 35 U.S.C. §119(a) of a Korean patent application filed on Jul. 25, 2011 in the Korean Intellectual Property Office and assigned Serial No. 10-2011-0073608, the entire disclosure of each of which is hereby incorporated by reference.

BACKGROUND OF THE INVENTION

1. Field of the Invention

The present invention relates to a wireless communication system. More particularly, the present invention relates to a method for avoiding interference between a plurality of heterogeneous wireless communication modules when the heterogeneous wireless communication modules coexist in a terminal.

2. Description of the Related Art

In recent years, with rapid supply of smart phones, demand and use of wireless LAN, Bluetooth, and GPS have rapidly increased. Various communication technologies, such as conventional cellular network technology (LTE/UMTS), wireless LAN and Bluetooth, and GNSS/GPS, frequently coexist. When heterogeneous communication technologies are used simultaneously, a mutual interference problem arises. In-Device Coexistence (IDC) has been discussed in the $3^{rd}$ Generation Partnership Project (3GPP). A heterogeneous communication technology other than LTE refers to interfering Communication Technology (CT).

LTE/UMTS communication technology operates at various frequency bands, whereas a communication technology such as Bluetooth or wireless LAN operates at an Industrial, Scientific and Medical (ISM) band of 2400~2483.5 MHz. In particular, among various bands using the LTE/UMTS communication technology, because Band 4 (2300-2400 MHz) and uplink band (2500-2570 MHz) of Band 7 are adjacent to an ISM band used by the Bluetooth and the wireless LAN, when they communicate simultaneously, a transmission signal in one communication technology is treated as a received signal in another communication technology, and may cause significant interference.

Accordingly, when a plurality of heterogeneous communication modules coexist in a terminal, there is a need for research into an approach capable of reducing interference between heterogeneous communication modules.

SUMMARY OF THE INVENTION

Aspects of the present invention are to address at least the above-mentioned problems and/or disadvantages and to provide at least the advantages described below. Accordingly, an aspect of the present invention is to provide a method for avoiding interference between heterogeneous communication modules, such as Long Term Evolution (LTE) and Wi-Fi, LTE and Bluetooth, LTE and a Global Positioning System (GPS), and the like when the heterogeneous communication modules coexist in a terminal, and an apparatus thereof.

According to an aspect of the present invention, when heterogeneous communication modules (e.g., wireless LAN or Bluetooth) in a terminal operate, a terminal reports a list of preference or non-preference frequency bands to a network to introduce handover.

According to an aspect of the present invention, a terminal does not camp-on (wait for a base station signal in an idle state of the terminal) bands that may cause an interference problem because of communication modules (e.g., wireless LAN or Bluetooth) therein. The terminal voluntarily controls an access priority order of a base station. The terminal reports a list of preference or non-preference frequency bands in a network re-entering (e.g., Radio Resource Control (RRC) connection setup of LTE) procedure.

In accordance with an aspect of the present invention, a method for controlling interference in a terminal with a plurality of heterogeneous communication modules in a wireless communication system is provided. The method includes accessing a cellular network through a first communication module performing cellular communication, receiving a driving request for a second communication module, and controlling driving of the second communication module so as not to interfere with communication of the first communication module.

In accordance with another aspect of the present invention, a method for controlling interference in a terminal with a plurality of heterogeneous communication modules in a wireless communication system is provided. The method includes receiving a driving request for a second communication module, determining preference bands or non-preference bands based on operating frequency bands of a first communication module performing cellular communication and a second communication module, setting a priority order for accessing a base station according to the preference bands or the non-preference bands, and performing an access procedure of a base station according to the set priority order.

In accordance with another aspect of the present invention, an apparatus for controlling interference occurring between a first communication module performing cellular communication and a second communication module performing communication other than communication of the first communication module is provided. The first communication module includes a transceiver for exchanging signals with a base station, an interference communication detecting/determining unit for detecting a driving request of the second communication module and for determining whether driving of the second communication module interferes with communication of the first communication module, and a controller for controlling the driving of the second communication module so as not to interfere with the communication of the first communication module when a notification of interference is received from the interference communication detecting/determining unit in an access state of a cellular network.

In accordance with another aspect of the present invention, an apparatus for controlling interference occurring between a first communication module performing cellular communication and a second communication module performing communication other than communication of the first communication module is provided. The first communication module includes a transceiver for exchanging signals with a base station, an interference communication detecting/determining unit for detecting a driving request of the second communication module and for determining whether a driving of the second communication module interferes with communication of the first communication module, and a controller for determining preference bands or non-preference bands using operating frequency bands of the first communication module and the second communication module when interference notification is received from the interference communication detecting/determining unit in an idle state, for setting a priority order for accessing a base station according to the preference bands or the non-preference bands, and for controlling execution of an access procedure for the base station according to the set priority order.

In accordance with an aspect of the present invention, a terminal is provided. The terminal includes a first communication module for performing cellular communication, a second communication module for performing communication different from the cellular communication, an interference unit for detecting operation of the second communication module and for determining whether the communication of the second communication module interferes with the communication of the first communication module, and a controller for controlling the second module so as not to interfere with the first communication module when the interference unit determines that the communication of the second communication module interferes with the communication of the first communication module.

According to aspects of the present invention, a terminal having heterogeneous communication modules may reduce use of frequency bands having strong interference to easily perform communication.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 2 is a diagram illustrating a method for avoiding interference in a terminal in an access state to a cellular network according to an exemplary embodiment of the present invention;

FIG. 3 is a diagram illustrating a method for avoiding interference in a terminal in an idle state in a cellular network according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For convenience of description, a cellular communication (or mobile communication) technology of the present invention is explained based on a Long Term Evolution (LTE) system. Exemplary embodiments of the present invention are also applicable to other cellular communication technologies.

Figure 1:
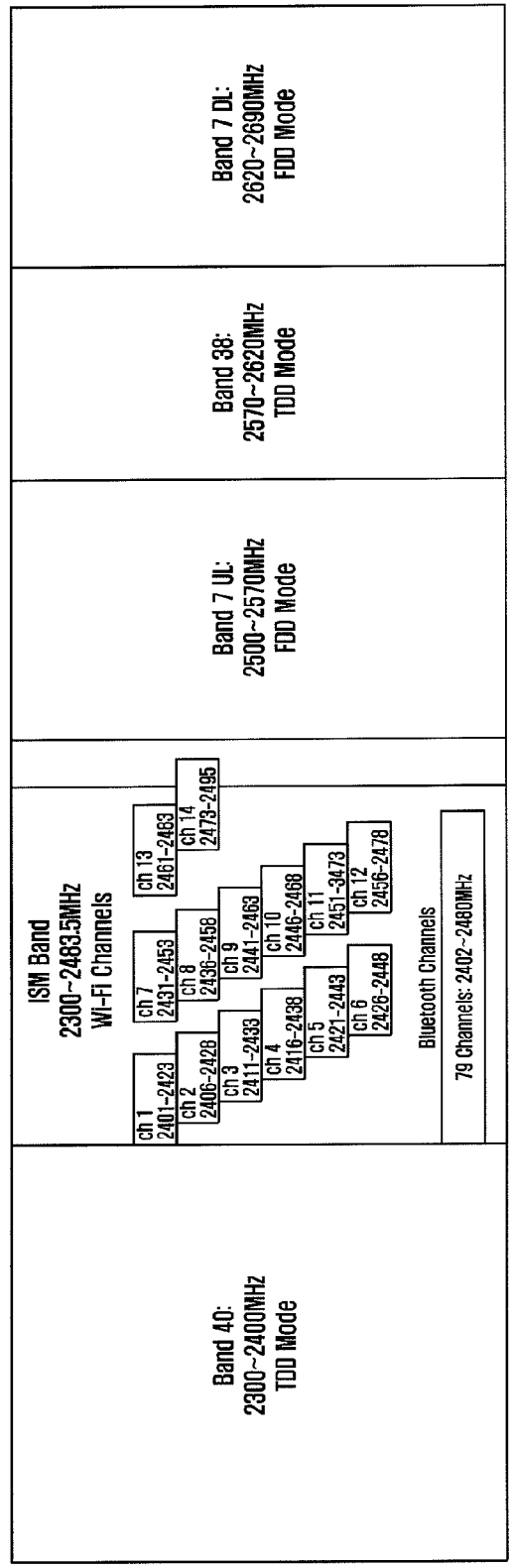
FIG. 1 is a view illustrating a frequency band adjacent to an Industrial Scientific Medical Band (IMS) band among frequency bands used for mobile communication in a current 3rd Generation Partnership Project (3GPP) according to an exemplary embodiment of the present invention.

FIG. 1 is a view illustrating a frequency band adjacent to an Industrial Scientific Medical Band (IMS) band among frequency bands used for mobile communication in a current $3^{rd}$ Generation Partnership Project (3GPP) according to an exemplary embodiment of the present invention.

Referring to FIG. 1, when a mobile communication cell uses Band 40 and a wireless LAN uses a channel number 1, interference is strong. Similarly, when the mobile communication cell uses Band 7 and a wireless LAN uses a channel number 13 or 14, interference is also strong.

Such an interference phenomenon may dynamically change according to locations and used frequencies of mobile communication base stations, a used channel, and a traffic pattern of a wireless LAN. Accordingly, there is a need for an interference avoiding technology suited to the situation.

A method is described below for reducing use of a frequency band having strong interference a terminal having heterogeneous communication modules to perform communication easily. The method may avoid interference in a terminal in an access state and avoid inference in a terminal in a non-access state in a cellular network.

A terminal according to an exemplary embodiment of the present invention may include heterogeneous communication modules, such as a first communication module performing wireless communication with a cellular network and a second communication module perform near or long distance wireless communication with a network other than the cellular network or an access point. The first communication module may be a cellular communication module using a mobile base station. The second communication module may include at least one of a wireless LAN (Wi-Fi module), a Bluetooth module, or a Global Positioning System (GPS) performing communication that may interfere with cellular communication (e.g., LTE communication) of a terminal.

FIG. 2 is a diagram illustrating a method for avoiding interference in a terminal in an access state to a cellular network according to an exemplary embodiment of the present invention. FIG. 2 illustrates operations of a terminal (UE) 201 and a base station (ENB) 203.

The terminal 201 accesses the base station 203 (RRC connection setup) through a network access procedure in step 205. The terminal 201 detects the driving of a second communication module or detects that driving of the second communication module is requested in step 207. The terminal detects that potential interference communication technology (referred to as interfering communication technology (CT) hereinafter) for cellular communication (e.g., LTE communication technology) is to be started. The foregoing detecting method may use a method for enabling the terminal 201 to detect turning-on a start button (or power button) of a GPS device, a wireless LAN, or a Bluetooth by a user, or a method for measuring and detecting a received signal from a cellular base station.

After detection, the terminal 201 communicates with the base station 203 to exchange data therewith such that the terminal 201 does not operate at an LTE band to be expected interfering with interfering CT through steps 209 and 211. For this operation, the terminal 201 may select preference bands having relatively weak interference with the interfering CT. The selection procedure is as follows.

1. The terminal 201 identifies an operation band of an interference CT which immediately starts or operates. This is denoted as a band A.

2. The terminal 201 identifies a band of a cellular system (e.g., LTE/UMTS/GSM system) which is now operating. This is denoted as a band B.

3. The terminal 201 sets bands where a band B is spaced apart from a band A by greater than a preset distance (e.g., x MHz) as preference bands. The terminal 201 sets bands where a band B is spaced apart from a band A by less than a preset distance (e.g., x MHz) as non-preference bands. The preset distance x may be a fixed value, be received from a base station, or be determined by signal filtering ability. The terminal 201 may create and store a preference band list or a non-preference band list through the foregoing procedure.

FIG. 2 illustrates a procedure creating the preference band list or the non-preference band list after a terminal 201 receives an interference communication request. However, exemplary embodiments of the present invention are not limited to the foregoing order. For example, since a frequency band using interfering CT uses a fixed value, the terminal may include a preference band list or a non-preference band list a time taken out of the warehouse.

After creating the preference band list or the non-preference band list, the terminal 201 determines whether a current operating frequency of cellular communication is included in preference bands. If the current operating frequency of cellular communication is included in the preference bands, the terminal 201 starts an interfering CT at once in step 215. If the terminal is performing the interfering CT, the terminal 201 continues performing the interfering CT.

When the current operating frequency of cellular communication is not included in preference bands but is included in non-preference bands, i.e., when the interfering CT interferes with cellular communication which is being performed by greater than a preset threshold, the terminal 201 may delay starting of the interfering CT before performing handover to one of preference bands.

The terminal 201 may generate and transmit an interference information report message to the base station in step 209. In this case, the interference information report message may be a Radio Resource Control (RRC) (layer controlling layer 2 in LTE system) message containing a preference band list and/or a non-preference band list and/or an identification identifying a type of interference CT (e.g., which one of wireless LAN, GPS, or Bluetooth interferes with). The non-preference band denotes a band that may have interference from interfering CT upon performing cellular communication, and more particularly refer to a band spaced apart from a band used by the interfering band by less than x MHz, as discussed above.

When the base station receives the RRC message, the base station 203 determines whether a current operation band of the terminal 201 for cellular communication is included in preference bands.

If the terminal 201 operates at the preference band, the base station 203 may store the preference band of the terminal 201, and then use the stored preference band to determine a target base station when handover of the terminal 201 is required.

If the terminal 210 does not operate at the preference band, the base station 203 determines whether the terminal 201 can perform handover to the preference band. If the terminal 201 can perform handover to the preference band, the base station 203 transmits an interference information report response message to the terminal 201 to instruct a handover procedure of the terminal 201 in step 211. The interference information report response message may be an RRC message containing information presence of handover of the terminal 201.

If the handover is performed, the terminal 201 may start interfering CT in step 215. After performing the handover, the terminal 201 may simultaneously use heterogeneous communication technologies (e.g., LTE and interfering CT).

If the terminal 201 detects that the interfering CT operation has stopped in step 217, the terminal 201 informs, in step 219, the base station 203 using an RRC message that the preference bands or the non-preference bands are required no longer and/or the interfering CT operation stops. Upon receiving the RRC message, the base station 203 releases restrictions related to preference or non-preference bands applied to a corresponding terminal 201.

If it is impossible to perform handover of the terminal 201 to a preference band (e.g., due to lack available resource of a base station operating at a preference band), the base station 203 informs the terminal 201 not to perform handover of the terminal 201 to the preference band through an RRC message in step 213. When the terminal 201 receives the RRC message, the terminal 201 informs a user of the fact so that the user may determine whether to start the interfering CT.

The foregoing exemplary embodiment has illustrated a method for reducing interference of the interfering CT with a terminal accessing a cellular system (e.g., LTE/UMTS/GSM). The interfering CT may affect an idle terminal that is not currently accessing the cellular system. For example, the terminal might not be able to receive a signal that the terminal should receive from a base station of the cellular system due to an interference signal of the interfering CT.

An terminal in an idle state does not 'camp-on' (an idle state of a terminal in a base station to receive a phone or data) a base station operating at a cellular network band adjacent to an operating band of the interfering CT. This is achieved by controlling cell selection/reselection priority order or omitting a specific (interfering) frequency band at cell reselection time. When the terminal enters an access mode after terminating access to a network, the terminal may report preference or non-preference bands.

FIG. 3 is a diagram illustrating a method for avoiding interference in a terminal in an idle state from a cellular network according to an exemplary embodiment of the present invention. FIG. 3 illustrates operations of a terminal (UE) 301 and a base station ENB 303.

Referring to FIG. 3, the terminal 301 in an idle state detects driving of a second communication module in step 305. This denotes detecting that the terminal 301 in an idle state starts interfering CT. The foregoing detecting method may use a method for detecting turning-on a start button (or power button) of a GPS device, a wireless LAN, or a Bluetooth by the user, or a method for measuring and detecting a received signal from a cellular base station.

After the detection, the terminal 301 determines preference bands and non-preference bands in step 307. A standard for distinguishing the preference bands from the non-preference bands is described above, and thus a detailed description thereof is omitted.

The terminal 301 sets a cell selection/reselection priority order of the smallest value for a non-reference band to minimize 'camping-on a cell operating at a non-preference band in step 309. The cell selection/reselection priority order is to control a degree of camping-on a specific frequency band or a specific cellular communication network by the terminal in an idle state. The base station 303 provides the cell selection/reselection priority order to the terminal 301. The terminal 301 compares a priority order of a frequency band of a current camping on cell with that of another frequency band provided from a current zone.

If a channel situation of a frequency band having a high priority order is higher than a predetermined reference value, the frequency band having a high priority order is preferentially selected even though a channel situation of a frequency band having a low priority order is better.

According to an exemplary embodiment of the present invention, to set a priority order of a non-preference frequency band to the lowest value by the terminal 301 denotes that the terminal 301 does not camp on the non-reference frequency band if another frequency band providing channels higher than predetermined quality exist at a periphery. The terminal 301 disregards a cell selection/reselection priority order allotted for a frequency band corresponding to a non-preference frequency and sets the lowest cell selection/reselection priority order with reference to a frequency band of a current camping on cell and a peripheral frequency band provided from system information of the current camping on cell when there is a frequency band corresponding to a non-preference frequency band.

The terminal 301 continues an idle state and then changes to an access state. The terminal 301 transmits a RRC connection setup request to the base station 303 in step 311. The base station 303 transmits an RRC connection setting message to the terminal 301 in step 313. The terminal 301 transmits an RRC connection setup complete message to the base station 303 in response thereto in step 315. The terminal 301 reports an RRC message containing preference bands and/or non-preference band and/or an identification of interfering CT to the base station 301 in step 315. The reported information should be reported to the base station rapidly if possible to prevent unnecessary handover to the non-reference bands.

The message to be transmitted to an LTE cellular network when the terminal 301 accesses the base station may be an RRC connection setup report message transmitted at step 311. Since the message is restricted in size, the message may not be suitable for the report information. A more suitable message including the report information is an RRC connection setup complete message transmitted at step 315. According to an exemplary embodiment of the present invention, the terminal 301 adds the report information to the RRC connection setup complete message and transmits the addition result message.

The base station 303 may reject an RRC connection setup request of the terminal 301. In this case, the base station 303 receives an RRC connection setup request message from the terminal and then transmits an RRC connection setup reject message. The message contains information regarding a frequency band for a next access attempt. This information is used for performing a next access attempt by the terminal 301 through a base station having a sufficient (busy less) wireless resource. However, an RRC connection setup reject message for redirection is transmitted before receiving an RRC connection setup complete message. The RRC connection setup reject message may be created to instruct the terminal to attempt a next access to a non-preference band of the terminal 301. In this case, the terminal 301 disregards redirection information of an RRC connection setup reject message and selects an optional band from preference bands to attempt access.

Figure 4A:
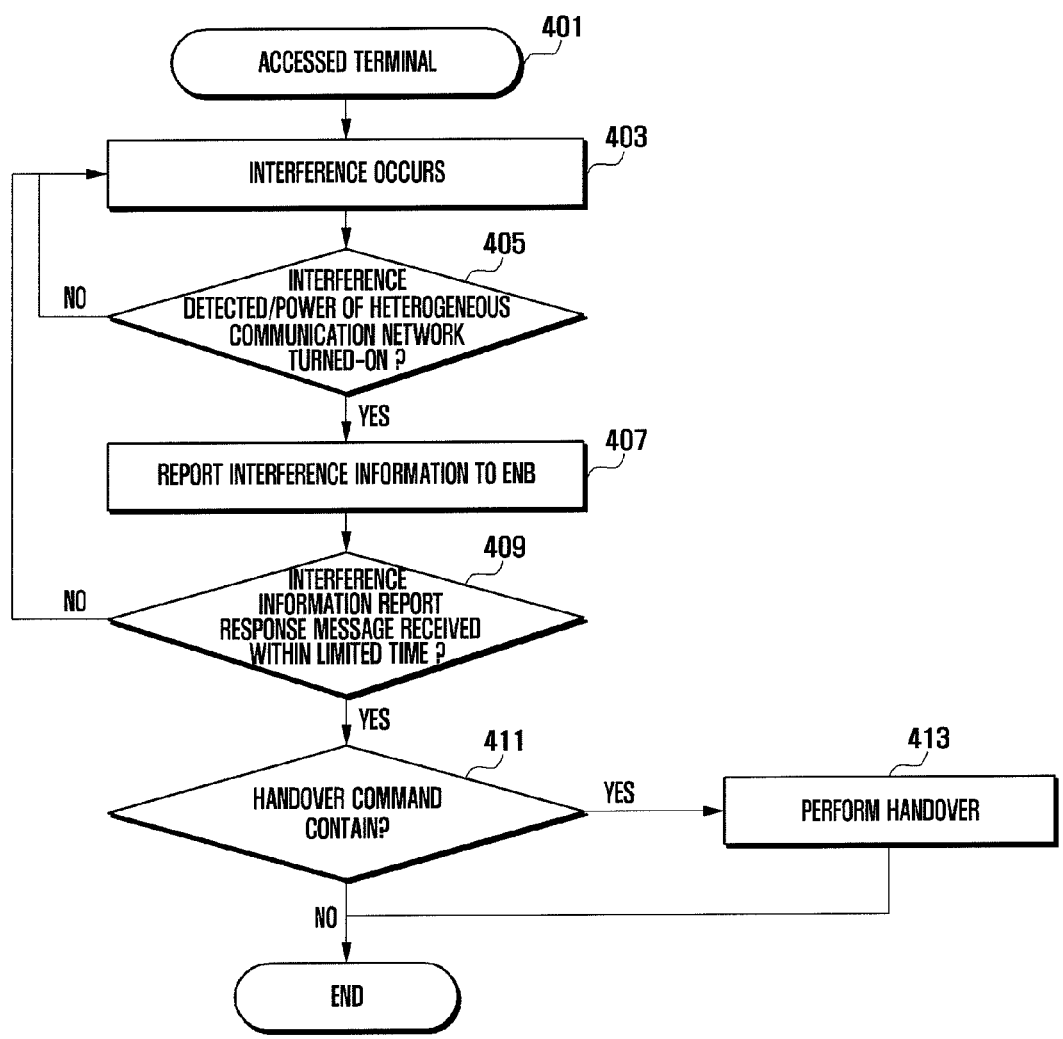
FIG. 4A is a flowchart illustrating a method for controlling interference in a terminal accessing a cellular network according to an exemplary embodiment of the present invention.

FIG. 4A is a flowchart illustrating a method for controlling interference in a terminal accessing a cellular network according to an exemplary embodiment of the present invention.

Referring to FIG. 4A, the terminal 201 accesses a cellular system in step 401. In step 403, it is determined whether interference occurs in the terminal 201 by measuring a received signal or receiving corresponding information from a heterogeneous network communication technology.

If interference is detected from a heterogeneous communication network or power of the heterogeneous communication network is turned-on through measurement of the received signal in step 405, the terminal 201 transmits an interference information report message to report interference information (preference and/or non-preference bands, identification of interfering CT or measured received signal value) to the base station 203 in step 407. For example, the information about the preference or non-preference bands may be an Absolute Radio Frequency Channel Number (ARFCN) associated with the preference or non-preference bands or a frequency band number (bandEUTRA defined in 36.331 in LTE) of the preference or non-preference bands.

The terminal 201 determines whether an interference information report response message is received within a limited time from the base station 203 in step 409. When the interference information report response message is not received, the process returns to step 403 and repeats the foregoing procedures.

When the interference information report response message is received within a limited time from the base station 203, the terminal 201 goes to step 411. When the interference information report response message contains a handover command, the terminal 201 performs handover according to a command from the base station in step 413.

If the interference information report response message does not contain the handover command, i.e., if a message capable of not performing handover is received, the process terminates the routine.

Figure 4B:
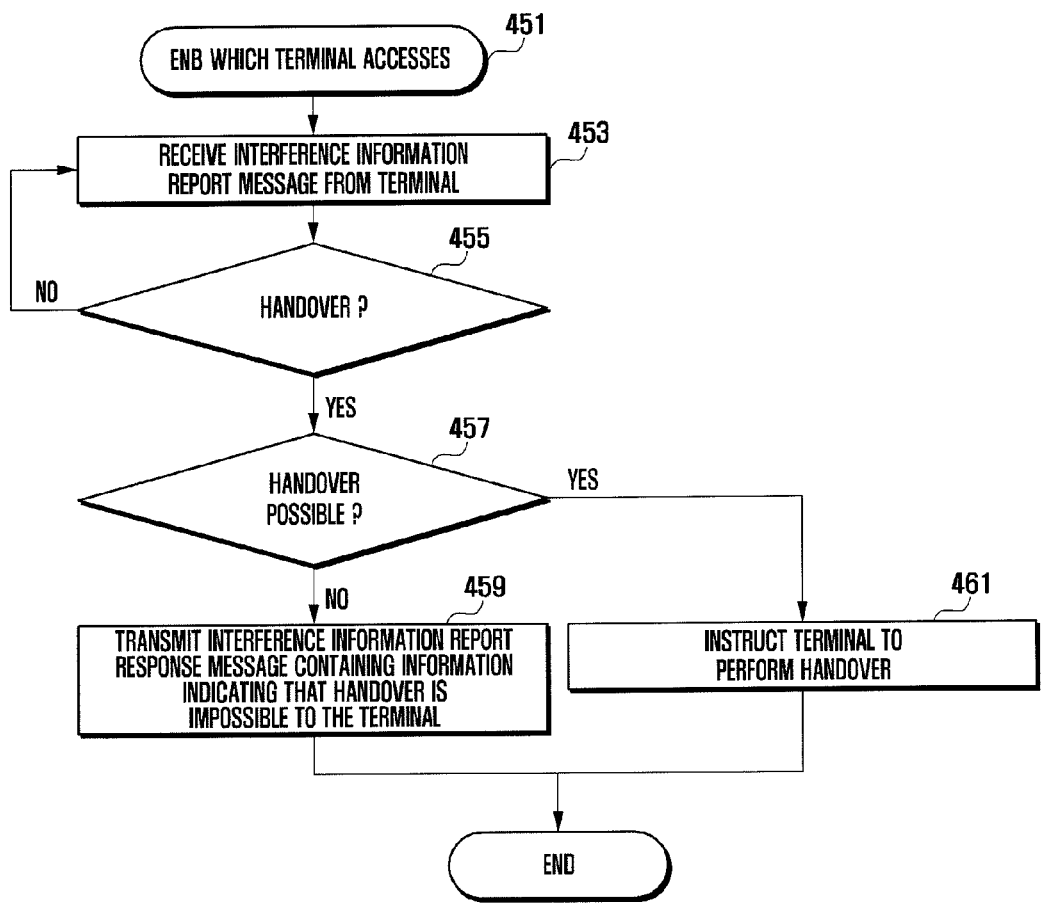
FIG. 4B is a flowchart illustrating a method for controlling interference in a terminal accessing a cellular network by a base station according to an exemplary embodiment of the present invention.

FIG. 4B is a flowchart illustrating a method for controlling interference in a terminal 201 accessing a cellular network by a base station 203 according to an exemplary embodiment of the present invention.

Referring to FIG. 4B, the base station 203 enables an access attempt of a terminal 201 through an RRC connection procedure in step 451. The base station 203 receives an interference information report message from the terminal 201 in step 453. The interference information report message contains at least one of a preference band list and/or a non-preference band list, an identification of interfering CT, or a measured received signal value.

The base station 203 determines to perform handover of the terminal 201 using the interference information provided from the terminal 201 in step 455. If the handover is performed, the base station 203 determines whether handover of the terminal 201 to a preference band is possible in step 457. When the handover is possible, the base station 203 instructs the terminal 201 to perform the handover in step 461. The base station 203 transmits an interference information report response message containing a handover command to the terminal 201. When handover is impossible, the base station 203 transmits an interference information report response message containing information indicating that the handover is impossible to the terminal 201 in step 459.

Figure 5A:
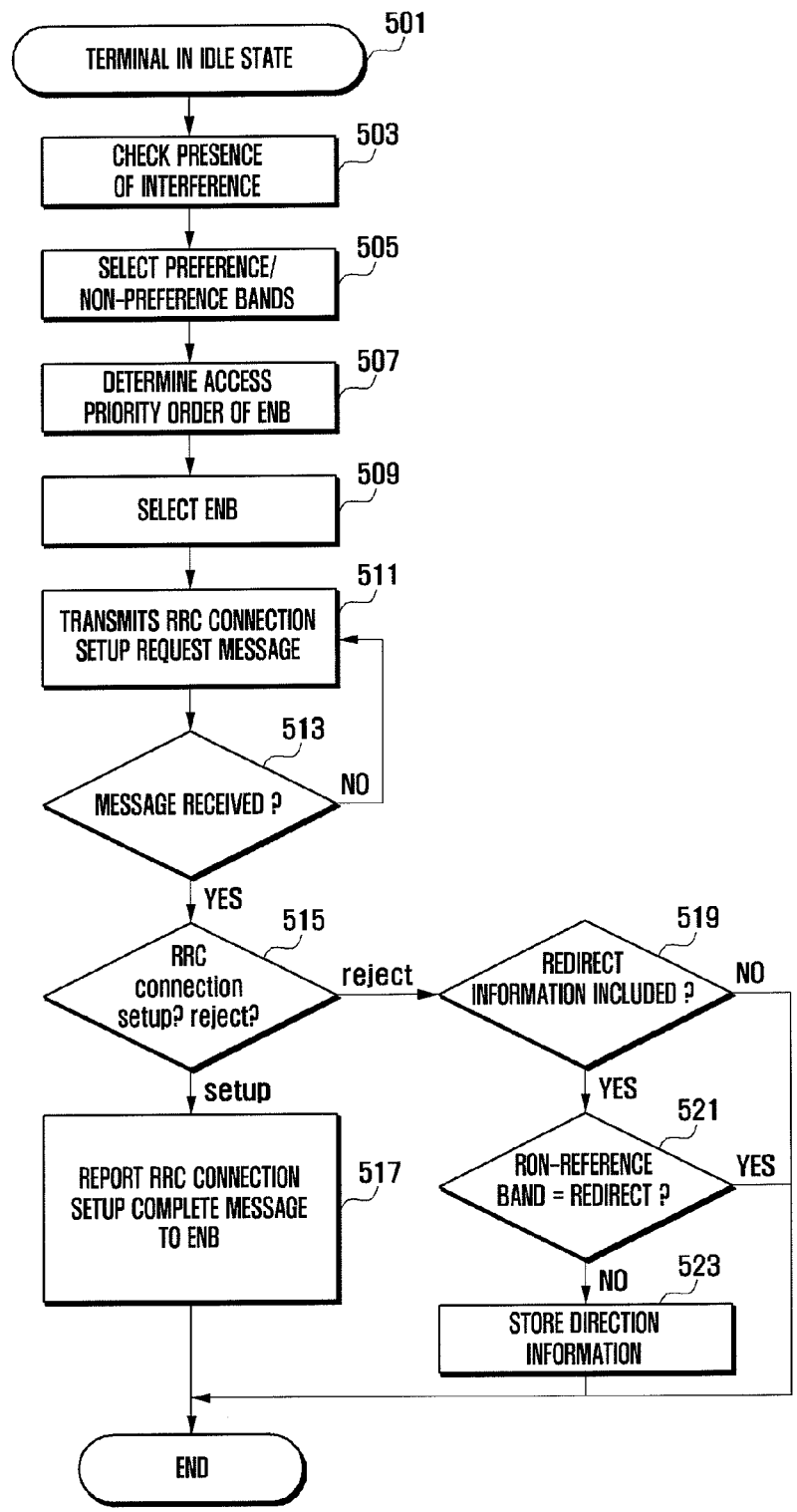
FIG. 5A is a flowchart illustrating a method for controlling interference in a terminal in an idle state from a cellular system according to an exemplary embodiment of the present invention.
Figure 5B:
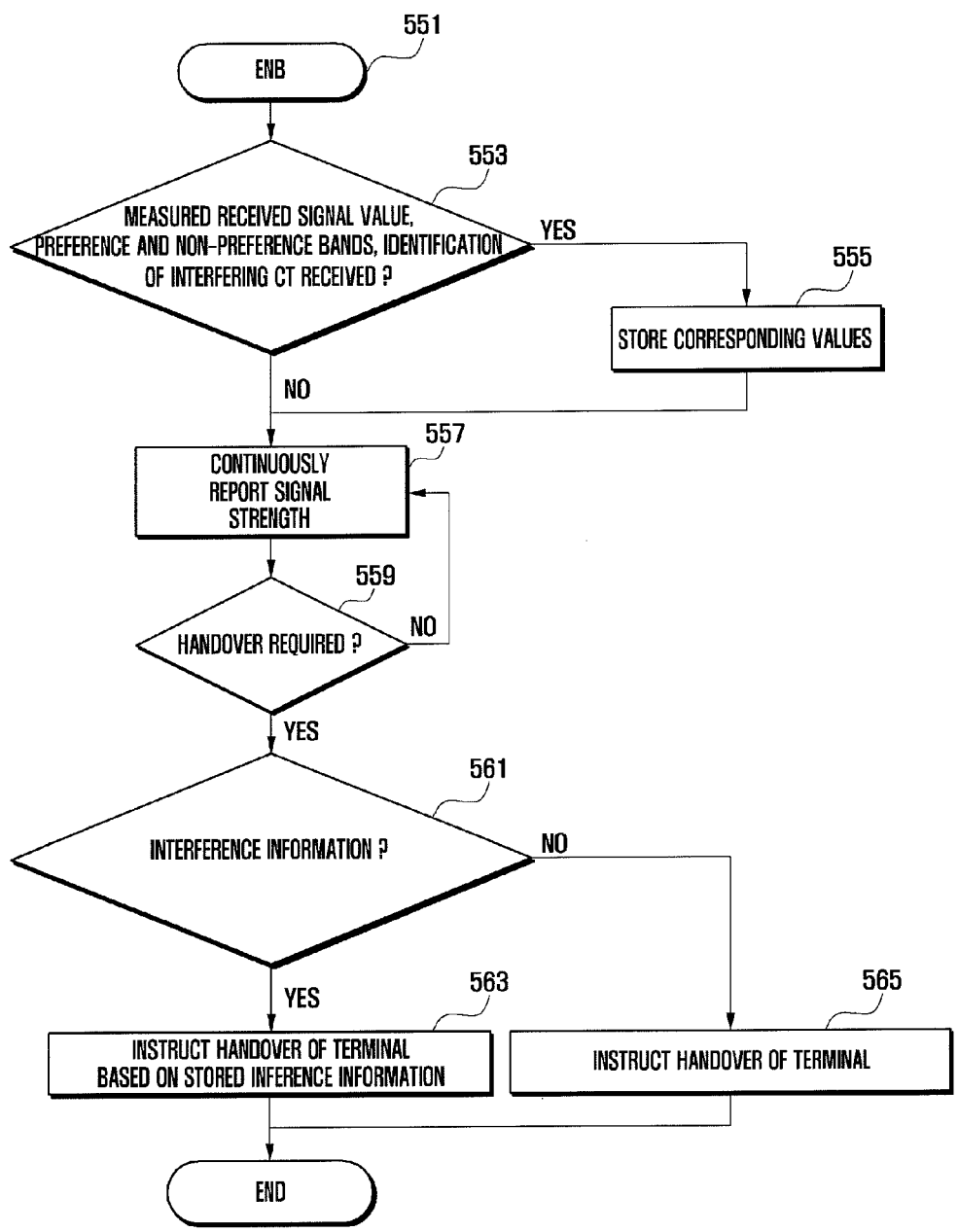
FIG. 5B is a flowchart illustrating a method for controlling interference in a terminal in an idle state from a cellular system by a base station according to an exemplary embodiment of the present invention.

FIGS. 5A and 5B are flowcharts illustrating a method for controlling interference in a terminal 301 in an idle state from a cellular system according to an exemplary embodiment of the present invention.

Referring to FIG. 5A, the terminal 301 is in an idle state in step 501. The terminal 301 determines the presence of interference through measurement of a received signal in step 503. The terminal 301 receives corresponding information from a heterogeneous communication module and selects preference and/or non-preference bands based on the received information in step 505. The terminal 301 determines an access priority order of a base station 303 in step 507, and selects the base station 303 according to the determined access priority order thereof in step 509.

To perform an entering procedure to a network, the terminal 301 transmits an RRC connection setup request message in step 511. After transmission of the RRC connection setup request message, when the terminal 301 does not receive an RRC connection setup message or an RRC connection reject message in step 513, the terminal 301 returns to step 511 and retransmits an RRC connection set request message.

When the terminal 301 receives an RCC connection setup message in step 515, the terminal 301 reports an RRC connection setup complete message including reference or non-reference bands and/or an identification of interfering CT and/or a measured received value to the base station 303 in step 517, and terminates a corresponding procedure.

When receiving an RRC connection rejection message at step 515, the terminal 301 determines whether the RRC connection rejection message includes redirect information with a command to another frequency band in step 519. When the RRC connection rejection message includes redirect information with a command to another frequency band, the terminal 301 determines whether non-reference bands set thereby are identical with redirect information in step 521. When the set non-reference bands differ from the redirect information, the terminal 301 stores the redirect information to use corresponding information upon entering a next network in step 523.

When the set non-reference bands are identical with the redirect information at step 521, the terminal 301 disregards redirect information received from the base station 303 and terminates a corresponding procedure in step 525.

FIG. 5B is a flowchart illustrating a method for controlling interference in a terminal 301 in an idle state by a base station 303 in a cellular system according to an exemplary embodiment of the present invention.

Referring to FIG. 5B, the base station 303 receives a network entering request from an optional terminal 301 in step 551. The base station 303 determines whether a measured received signal value and/or preference and/or non-preference bands, and an identification of interfering CT is received (corresponding to step 517 by a terminal) in step 553. When the measured received signal value and/or the preference and/or non-preference bands, and the identification of interfering CT are received, the base station 303 stores corresponding values in step 555.

Subsequently, the terminal 310 finishes a network entering procedure, and continuously reports signal strength to the base station 303 for handover in step 557. When it is determined that handover of a terminal 301 is required according to a signal strength provided from the terminal 301 at step 559, the base station 303 determines whether interference information is received from the terminal 301 at a previous step 553 in step 561. When interference information has been received from the terminal 301, the base station 303 selects a target base station based on interference information stored at step 555 to instruct the terminal 301 to perform handover in step 563.

Figure 6:
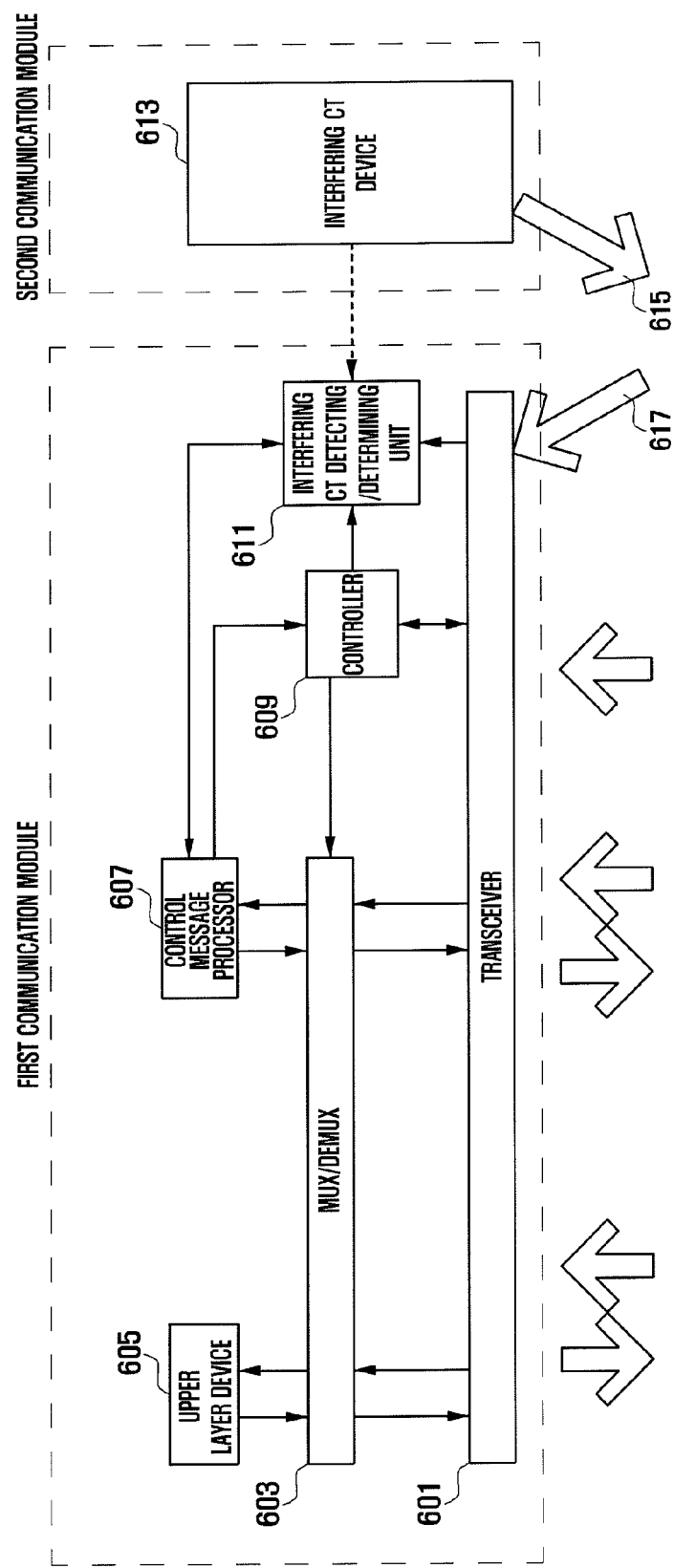
FIG. 6 is a block diagram illustrating a configuration of a terminal according to an exemplary embodiment of the present invention.

FIG. 6 is a block diagram illustrating a configuration of a terminal according to an exemplary embodiment of the present invention.

Referring to FIG. 6, a terminal 201 according to an exemplary embodiment of the present invention may include a first communication module and a second communication module. The first communication module is a module for performing cellular communication using a mobile base station. The second communication module may include at least one of a Wi-Fi module, a Bluetooth module, or a Global Positioning System (GPS) module that may interfere with cellular communication (e.g., LTE communication) of the terminal. As shown in FIG. 6, the second communication module may denote an interfering CT device 513.

The terminal 201 exchanges data with an upper layer 605, and transmits and receive control messages through a control message processor 607. Upon transmission, the terminal 201 multiplexes data by a multiplexer/demultiplexer 603 and transmits the multiplexed data through a transceiver 601 under the control of a controller 609.

Upon reception, the terminal 201 receives a physical signal by the transceiver 601 under the control of the controller 609, demultiplexes the received physical signal by the multiplexer/demultiplexer 603, and transfers the demultiplexed signal to an upper layer device 505 or the control message processor 607.

An interfering CT device 613 may inform an interfering CT sensing/determining unit 611 that power of a second communication module is turned-on or the second communication module is beginning to operate. A signal 615 transmitted from the interfering CT device 613 acts as a strong interference signal 617 to the transceiver 601 of the first communication module, and the controller 607 may sense the strong interference signal 617 to directly inform the interfering CT sensing/determining unit 611 of an interference situation.

If the interfering CT sensing/determining unit 611 senses interference with the second communication module, it determines whether it is necessary to avoid interfering CT. When it is necessary to avoid interfering CT, the interfering CT sensing/determining unit 611 informs the controller 609 of this fact. When an interference influence is greater than a preset threshold, the interfering CT sensing/determining unit 611 may determine that it is necessary to avoid interference. Accordingly, the controller 609 informs a control message processor 607 of interfering CT related information according to a state (access mode or idle mode) of the terminal, and transmits the corresponding information to allow the base station to recognize the information.

When the terminal is in an access mode, upon reception of a driving request for a second communication module, the controller 609 controls driving of the second communication module not to interfere with communication of the first communication module. The controller 609 selects preference bands or non-preference bands using operating frequency bands of the first communication module and the second communication module, and creates and transmits interference information with one of the preference bands or the non-preference bands to the base station. The controller 609 may determine a frequency band where an operating frequency band of the second communication module is spaced apart from an operating frequency band of the first communication module by greater than a preset distance as preference bands. The controller 609 may determine a frequency band where an operating frequency band of the second communication module is spaced apart from an operating frequency band of the first communication module by less than a preset distance as non-preference bands.

When an operating frequency band of the first communication module is a preference band, the controller 609 controls the second communication module to be driven. When an operating frequency band of the first communication module is a non-preference band, the controller 609 determines whether a handover command is received from the base station. When the handover command is received, the controller 609 controls to perform handover of the terminal to the preference band.

When the terminal is in an idle mode, the controller 609 sets a priority order for accessing a base station according to preference bands or non-preference bands. The controller 609 may set the non-preference bands as the lowest priority order for accessing a base station.

When the terminal attempts to access the base station, the controller 609 controls transmission of an RRC connect setup request message to the base station to change the terminal to an access state. When receiving the RRC connection setup message from the base station according to the transmission, the controller 609 may control transmission of an RRC connection setup complete message including at least one of the preference bands or the non-preference bands to the base station.

Upon reception of an RRC connection reject message from the base station according to transmission of the RRC connection setup request message, the controller 609 may analyze redirection information included in the RRC connection reject message. If the non-preference bands of the terminal differ from the redirect information, the controller 609 may control storage of the redirect information.

Figure 7:
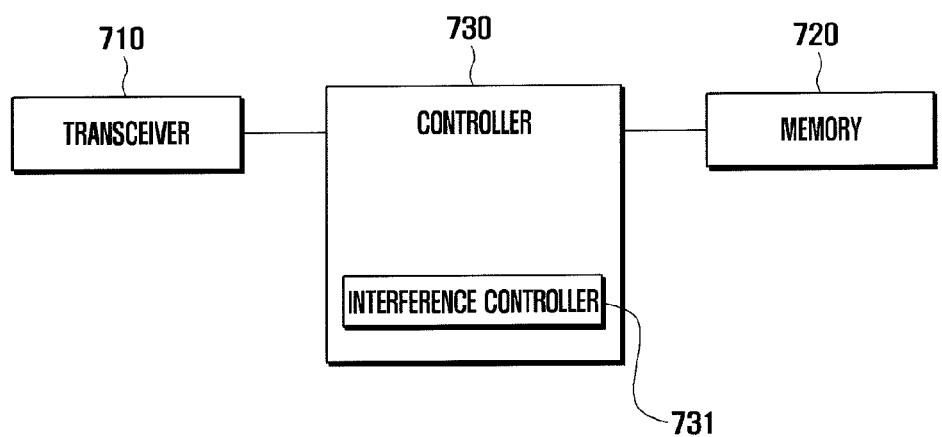
FIG. 7 is a block diagram illustrating a configuration of a base station according to an exemplary embodiment of the present invention.

FIG. 7 is a block diagram illustrating a configuration of a base station according to an exemplary embodiment of the present invention.

Referring to FIG. 7, the base station may include a transceiver 710, a memory 720, and a controller 730.

The transceiver 710 performs transmission and reception of signals, data, and messages between a base station and a terminal or between the base station and a cellular network node. The transceiver 710 may include a wired or wireless interface.

The memory 720 may store programs necessary to operate the base station 203 according to an exemplary embodiment of the present invention. The memory 720 may store interference information provided from the terminal. The interference information may contain a preference band list, a non-preference band list, and/or interference communication identification.

The controller 730 controls overall operations of a base station. The controller 730 may include an interference controller 731 to control interference occurring in a terminal by the base station.

When the terminal is in an access state, the interference controller 731 senses reception of an interference information report message provided from the terminal. The interference controller 731 determines whether to perform handover of the terminal using the interference information provided from the terminal. For the terminal to perform handover, the interference controller 731 determines whether handover of the terminal to a preference band is possible. When the handover of the terminal to the preference band is possible, the interference controller 731 instructs the terminal to perform the handover. The interference controller 731 transmits an interference information report response message including a handover command to the terminal.

When the handover is impossible, the interference controller 731 transmits an interference information report response message including information indicating that the handover is impossible to the terminal.

The interference controller 731 may sense that the terminal receives a network entering request from an idle terminal in an idle state. Accordingly, the interference controller 731 determines whether a measured received signal value, preference bands, non-preference bands, and/or an identification of interfering CT are received. When the measured received signal value, the preference bands, the on-preference bands, and/or the identification of interfering CT are received, the interference controller 731 stores the corresponding values in the memory 720.

The interference controller 731 receives signal strength from the terminal, and determines whether handover of the terminal is necessary. When the handover of the terminal is necessary, the interference controller 731 instructs handover of the terminal to a target base station using interference information received from the terminal. The foregoing approaches avoid interference from a current interference situation or potential interference factors to minimize interference, such that the terminal may communicate with a cellular network.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling interference by a terminal in a wireless communication system, the method comprising:
   identifying an in-device coexistence (IDC) interference between a first transceiver and a second transceiver;
   generating first control information including a frequency band suffering from the IDC interference;
   transmitting, to a base station, the first control information to report the IDC interference; and
   transmitting, to the base station, second control information indicating a termination of the IDC interference if the termination of the IDC interference is identified,
   wherein the frequency band includes at least one carrier related to the first transceiver.

2. The method of claim 1, wherein the IDC interference is identified based on a received power level of a desired signal for the first transceiver and an interference power coming from a transmitter of the second transceiver.

3. The method of claim 1, further comprising:
   determining whether a handover command is received from the base station; and
   performing a handover to avoid the IDC interference when the handover command is received.

4. The method of claim 1, wherein the frequency band suffering from the IDC interference includes at least one carrier related to a Long Term Evolution Network.

5. A method for controlling interference by a base station in a wireless communication system, the method comprising:
   receiving, from a terminal, first control information to report an in-device coexistence (IDC) interference between a first transceiver and a second transceiver of the terminal, if the IDC interference is identified by the terminal; and
   receiving, from the terminal, second control information indicating a termination of the IDC interference, if the termination of the IDC interference is identified by the terminal,
   wherein the first control information includes a frequency band suffering from the IDC interference, and
   wherein the frequency band includes at least one carrier related to the first transceiver of the terminal.

6. The method of claim 5, wherein the IDC interference is identified based on a received power level of a desired signal for the first transceiver and an interference power coming from a transmitter of the second transceiver.

7. The method of claim 5, further comprising:
   determining whether to apply a handover procedure for the terminal based on the first control information; and
   transmitting a handover command to the terminal when applying the handover procedure for the terminal is determined.

8. The method of claim 5, the frequency band suffering from the IDC interference includes at least one carrier related to a Long Term Evolution Network.

9. A terminal for controlling interference in a wireless communication system, the terminal comprising:
   a first transceiver configured to perform a first communication;
   a second transceiver configured to perform a second communication; and
   a controller coupled to the first transceiver and the second transceiver, wherein the controller is configured to:
      identify an in-device coexistence (IDC) interference between the first transceiver and the second transceiver,
      generate first control information including a frequency band suffering from the IDC interference,
      transmit, to a base station, the first control information to report the IDC interference, and
      transmit, to the base station, second control information indicating a termination of the IDC interference if the termination of the IDC interference is identified,
   wherein the frequency band includes at least one carrier related to the first transceiver.

10. The terminal of claim 9, wherein the IDC interference is identified based on a received power level of a desired signal for the first transceiver and an interference power coming from a transmitter of the second transceiver.

11. The terminal of claim 9, wherein the controller is further configured to:
    determine whether a handover command is received from the base station, and
    perform a handover to avoid the IDC interference when the handover command is received.

12. The terminal of claim 9, wherein the frequency band suffering from the IDC interference includes at least one carrier related to a Long Term Evolution Network.

13. A base station for controlling interference in a wireless communication system, the base station comprising:
    a transceiver configured to transmit and receive a signal; and
    a controller coupled to the transceiver, wherein the controller is configured to:
       receive, from a terminal, first control information to report an in-device coexistence (IDC) interference between a first transceiver and a second transceiver of the terminal, if the IDC interference is identified by the terminal, and
       receive, from the terminal, second control information indicating a termination of the IDC interference, if the termination of the IDC interference is identified by the terminal,
    wherein the first control information includes a frequency band suffering from the IDC interference, and
    wherein the frequency band includes at least one carrier related to the first transceiver of the terminal.

14. The base station of claim 13, wherein the IDC interference is identified based on a received power level of a desired signal for the first transceiver and an interference power coming from a transmitter of the second transceiver.

15. The base station of claim 13, wherein the controller is further configured to:
    determine whether to apply a handover procedure for the terminal based on the first control information, and
    transmit a handover command to the terminal when applying the handover procedure for the terminal is determined.

16. The base station of claim 13, the frequency band suffering from the IDC interference includes at least one carrier related to a Long Term Evolution Network.

* * * * *